UNITED STATES PATENT OFFICE.

MAX H. ISLER, OF MANNHEIM, GERMANY, ASSIGNOR TO THE BADISCHE ANILIN & SODA FABRIK, OF LUDWIGSHAFEN-ON-THE-RHINE, GERMANY, A CORPORATION OF GERMANY.

ANTHRACENE DYE AND PROCESS OF MAKING SAME.

SPECIFICATION forming part of Letters Patent No. 715,662, dated December 9, 1902.

Application filed December 19, 1900. Serial No. 40,443. (Specimens.)

*To all whom it may concern:*

Be it known that I, MAX HEINRICH ISLER chemist, a citizen of the Swiss Republic, residing at Mannheim, in the Grand Duchy of Baden, Germany, have invented new and useful Improvements in Anthracene Dyes and Processes of Making the Same, of which the following is a specification.

My invention relates to the manufacture of coloring-matters from methyl-anthraquinone. (See *Berichte*, Vol. 10, page 1485, and Vol. 15, page 1820.)

The methyl-anthraquinone is first nitrated. The nitro compounds so obtained are converted into amido compounds either by reduction or by heating the nitro compounds with an aromatic amin, in which latter case alphyl-amido-methyl-anthraquinones are obtained. By "amido compounds" I understand both mono and diamido-methyl-anthraquinones as well as their alphylated derivatives. The amido or the alphyl-amido compounds are treated with halogens, and the halogen derivatives so obtained are condensed with aromatic amins. The resulting coloring-matter bases are sulfonated to render them soluble, or, what is equivalent for the purposes of this invention, the introduction of the necessary sulfo group or groups is effected in part or wholly at an earlier stage of the process—for instance, after the production of the amido derivative. The dyes obtained in this way are new bodies. The coloring-matters so obtained as a rule dye wool from the acid-bath blue to green shades possessing a valuable degree of fastness. The shades obtained differ from those given by the corresponding coloring-matters from anthraquinone in a characteristic manner—for instance, the coloring-matter obtained from mono-nitromethyl-anthraquinone by reduction, treatment with bromin, heating with paratoluidin, and sulfonating dyes a shade of blue which is essentially redder than the corresponding product obtained from anthraquinone itself. The nitration of the methyl-anthraquinone can be so conducted that as desired either one nitro group is or two nitro groups are introduced. The manner of production of the mononitro and the dinitro compounds has already been described, the properties of the latter, however, not being shown. (See *Berichte*, Vol. 16, page 695.) The treatment with halogen can be effected by direct treatment with bromin or chlorin in aqueous suspension or in the presence of other solvents or diluents, or other halogenizing agents may be employed. The condensation with the aromatic amido compounds can be effected by heating the halogen compounds with the said amins.

The following examples will serve to illustrate the manner in which my invention may be carried into practical effect, but the invention is not confined to the reactions exemplified. The parts are by weight.

Example 1: Convert about ten (10) parts of 2-methyl-anthraquinone into the mono-nitro derivative in the well-known way. (See *Berichte*, Vol. 16, page 697.) Convert the nitro compound thus obtained into the amido compound either in the known way or preferably by treatment with five (5) parts of crystallized sodium sulfid and six hundred (600) to eight hundred (800) parts of water. Brominate this amido compound in either of the following ways: (A) Treat it in a closed vessel with bromin vapor; (B) suspend the amido compound in water and stir it with two (2) to three (3) times its weight of bromin while keeping the mixture cool; (C) dissolve the amido compound in ten (10) times its weight of glacial acetic acid and treat with from two (2) to three (3) parts of bromin; (D) convert the amido compound into the corresponding sulfo-acid by means of fuming sulfuric acid and boracic acid; pour the melt into ten (10) to fifteen (15) times its weight of water and add bromin to the solution. The next step is the treatment with an aromatic amin. For this purpose take, for instance, ten (10) parts of the brominated product obtained as described in glacial acetic-acid solution. Mix it with two hundred (200) parts of paratoluidin and heat in a vessel provided with an inverted condenser, so that it boils for from one and a half (1½) to two (2) hours. Allow the mixture to cool, add three (3) parts of alcohol, filter, and wash with alcohol, so as to remove the toluidin from the coloring-matter base so obtained. This is converted into a soluble sulfo-acid by treatment with twenty

(20) times its weight of concentrated sulfuric acid or mono-hydrate at a moderate temperature. The unsulfonated product thus obtained is soluble in concentrated sulfuric acid (containing about ninety-six per cent. of $H_2SO_4$) with a bluish-red color, in hot anilin with a pure blue color, in glacial acetic acid with a violet-blue color, and in nitro-benzene with a blue color. It is practically insoluble in water.

Example 2: Dissolve about ten (10) parts of 2-methyl-anthraquinone in one hundred (100) to one hundred and fifty (150) parts of concentrated sulfuric acid (containing from ninety-six to one hundred per cent. of $H_2SO_4$) and add to the mixture twenty-eight (28) parts of a nitrating acid—that is, an acid of the composition of one (1) part, by weight, of $HNO_3$ and two (2) parts, by weight, of $H_2SO_4$. Heat the mixture for about six (6) hours on the water-bath. The new dinitro compound thus obtained can be reduced with sodium sulfid and further treated with bromin, the product condensed with aromatic amins and sulfonated in a manner similar to that described in the foregoing Example 1. The new coloring-matter thus obtained dyes unmordanted wool, giving a much greener shade of blue than the coloring-matter obtained according to Example 1.

If desired, the diamido compound obtained by reduction may be sulfonated in the known manner and then treated with bromin, the product condensed with aromatic amins and, if desired, further sulfonated.

Example 3: A. Nitrate 2-methyl-anthraquinone in the manner described in the foregoing Example 2 and extract the nitration product with glacial acetic acid. Mix together ten (10) parts of the residual nitro compound thus obtained (which I regard as a 1.5-dinitro-beta-methyl-anthraquinone) and two hundred (200) parts of paratoluidin. Boil the mixture in a vessel provided with an inverted condenser for about five (5) or six (6) hours and allow the mixture to cool. Extract the excess of toluidin by warming with six hundred (600) parts of dilute alcohol, (containing, say, about ninety per cent. of alcohol.) Allow the mixture to cool, and collect the toluid by filtering. Upon sulfonation this can be made to yield a soluble coloring-matter, which dyes wool from the acid-bath dark Bordeaux-red shades. Instead of using the purified nitro compound the crude nitration product can be used. In the same way the mono-nitro-methyl-anthraquinone, either crude or purified, can be treated with paratoluidin and the product sulfonated, and in all cases the paratoluidin can be replaced by other aromatic amins.

B. The di-para-toluido-methyl-anthraquinone obtained according to the manner described in the foregoing portion A of this example can be halogenized in the following manner: Suspend about ten (10) parts of the said toluid compound in one hundred (100) parts of glacial acetic acid and add thirty (30) parts of bromin. Boil for from one (1) to one and a half ($1\frac{1}{2}$) hours, allow to cool, and collect the difficultly-soluble bromid by filtering. In a similar manner other alphylido compounds obtained from the di-nitro or mono-nitro 2-methyl-anthraquinone can be converted into halogen derivatives.

C. The treatment of the bromid obtained in the manner described in the foregoing portion B of this example with an aromatic amin can be effected as follows: Mix together ten (10) parts of the said bromid and one hundred (100) parts of paratoluidin. Heat the mixture so that it boils in a vessel provided with an inverted condenser for about one (1) hour. Allow the mixture to cool, extract the toluidin by means of alcohol, and collect in the usual way. In a similar manner the other hereinbefore-described halogen bodies can be treated with primary aromatic amins.

Example 4: The sulfonation can be effected in all these cases by treatment with the known sulfonating agents in the usual manner—for instance, by treating the body obtained in the above Example 3 with from ten (10) to twenty (20) times its weight of ordinary concentrated or mono-hydrate sulfuric acid or with fuming sulfuric acid in the presence or absence of boric acid. Thus, into a mixture of two hundred (200) parts of fuming sulfuric acid (containing about thirty per cent. of $SO_3$) and ten (10) parts of anhydrous boric acid introduce ten (10) parts of the condensation product from brom or chlor-amido-2-methyl-anthraquinone and paratoluidin. Stir at a temperature of about one hundred (100) degrees centigrade for two (2) hours. Pour the mass into water and salt out with common salt or potassium chlorid the sulfo-acid formed. The coloring-matter thus obtained dyes wool green.

The following table gives some of the properties of some of the coloring-matters obtained according to my invention:

| | Sulfo-acid obtained. | | |
|---|---|---|---|
| | Example 1. | Example 2. | Example 4. |
| Solution in water | Violet-blue | Green-blue | Pure blue. |
| Solution in concentrated sulfuric acid (containing ninety-six per cent. of $H_2SO_4$) in thin layers. | Blue-violet | Red-violet | Violet-red. |
| Solution in concentrated sulfuric acid and boric acid on warming | Blue with red fluorescence. | Blue-green | |
| Solution in anilin | Blue | Blue-green | Practically insoluble. |
| Solution in glacial acetic acid | | | Blue. |
| Dyes unmordanted wool | Blue | Blue-green | Green-blue. |

I claim—

1. The process for the manufacture of coloring-matters of the anthracene series which consists in nitrating methyl-anthraquinone, converting the nitro compound into an amido compound, converting this into a halogen derivative, and condensing the halogen derivative with an aromatic amin.

2. The process for the manufacture of coloring-matter of the anthracene series which consists in nitrating methyl-anthraquinone, converting the nitro compound into an alphyl-amido compound, converting this into a halogen derivative and condensing the halogen derivative with an aromatic amin.

3. The process for the manufacture of coloring-matters of the anthracene series which consists in nitrating methyl-anthraquinone, converting the nitro compound into an amido compound, converting this into a halogen derivative and condensing the halogen derivative with an aromatic amin and sulfonating the product thus obtained.

4. The process for the manufacture of coloring-matters of the anthracene series which consists in nitrating methyl-anthraquinone, converting the nitro compound into an alphyl-amido compound, converting this into a halogen derivative, condensing the halogen derivative with an aromatic amin and sulfonating the product thus obtained.

5. As a new article of manufacture the new coloring-matter which can be derived from methyl-anthraquinone, which in the sulfonated form dyes unmordanted wool blue to green shades, and is soluble in water yielding a bluish solution, and whose solution in concentrated sulfuric acid is violet.

6. As a new article of manufacture the new coloring-matter which can be derived from methyl-anthraquinone, which in its sulfonated form dyes unmordanted wool green-blue, and gives with water a pure blue solution, whose solution in concentrated sulfuric acid is violet-red, which is insoluble in anilin, and whose solution in glacial acetic acid is blue.

In testimony whereof I have hereunto set my hand in the presence of two subscribing witnesses.

MAX H. ISLER.

Witnesses:
ERNEST F. EHRHARDT,
OSCAR BALTZ.